United States Patent [19]

Kanamaru

[11] 4,196,796
[45] Apr. 8, 1980

[54] FRICTIONAL VIBRATION DAMPER

[76] Inventor: Yasutaka Kanamaru, Sanwatekki Okamotoryo, 2703 Nakaokamoto, Kawachimachi, Kawachigun Tochigi-ken, Japan

[21] Appl. No.: 842,988

[22] Filed: Oct. 17, 1977

[30] Foreign Application Priority Data

Dec. 17, 1976 [JP] Japan .................. 51-152249

[51] Int. Cl.$^2$ .............................. B60T 7/12
[52] U.S. Cl. .................... 188/134; 188/1 B; 188/72.7; 192/54; 192/103 C; 248/562; 248/567
[58] Field of Search .............. 188/1 B, 129, 130, 134, 188/135, 136, 185, 187, 72.7; 192/7, 54, 103 C; 16/82, 83; 248/562, 567

[56] References Cited

U.S. PATENT DOCUMENTS

| 2,139,666 | 12/1938 | Bogart | 188/129 X |
| 3,034,619 | 5/1962 | Glasgow et al. | 192/7 |
| 3,067,847 | 12/1962 | Beach | 188/185 X |
| 3,338,361 | 8/1967 | Hoff | 192/54 X |
| 3,367,456 | 2/1968 | Bohnhoff | 192/7 X |
| 3,453,905 | 7/1969 | Schmid | 192/54 X |
| 3,983,965 | 10/1976 | Wright, Jr. | 188/129 X |

FOREIGN PATENT DOCUMENTS 1580795 7/1970 Fed. Rep. of Germany ........... 188/134

*Primary Examiner*—George E. A. Halvosa
*Attorney, Agent, or Firm*—Holman & Stern

[57] ABSTRACT

A vibration damping mechanism particularly useful for accommodating both gradual displacements of piping or similar structures such as can be caused by thermal deformation and rapid vibrations such as can be caused by earthquakes or other externally applied forces. The mechanism comprises two housing portions movable relative to each other, one of the housing portions being attached at one end thereof to a stationary structure, such as a wall of a buidling, while the other housing portion is attached to a section of piping whose movement is to be damped. Substantially concentric wheel members are disposed internally of one of the housings, the wheel members being spring-biased relative to each other, to absorb both gradual and rapid displacements of the piping relative to the stationary structure.

2 Claims, 3 Drawing Figures

FRICTIONAL VIBRATION DAMPER

BACKGROUND OF THE INVENTION

1. Field of the Invention

The present invention relates to damping mechanisms, particularly damping mechanisms deployed between a stationary structure such as a wall of a building and a structure such as a section of piping the vibrations of which are to be damped relative to the stationary structure.

2. Description of the Prior Art

Vibration damping mechanisms for protecting piping in a power plant or chemical plant from vibration are known in the art. In such situations, it is necessary for the vibration damping mechanism to follow both gradual movement of the piping which can be caused by thermal deformation or the like and to also effectively damp rapid vibrations caused by earthquakes or other externally applied forces. While prior devices have utilized a pair of housings mounted relative to each other by means of a ball screw mechanism, these prior dampers prove ineffective with external vibrations with the damper structure at the natural frequency of said structure, the vibration damping function being considerably reduced. The present structure eliminates this prior art defect by providing a plurality of friction pins in contact with internal surfaces of the primary housing of the damper, the frictional resistance of the pins damping such resonant vibrations so as to maintain the damping capability of the present structure at all vibrational frequencies.

SUMMARY OF THE INVENTION

The present invention provides a frictional vibration damper comprised of two housing portions movable relative to each other, said housing portions being connected by a ball screw mechanism and associated rod structure on which concentric wheel members are disposed internally of one of the housing portions. Spring-biased friction pins extending radially of the wheel members and in effective contact therewith extend through parametrically disposed apertures in the outermost wheel member to damp vibrations by virtue of contact between the outer ends of the friction pins and the inner surfaces of the housing containing the wheel members.

Accordingly, it is an object of the present invention to provide a frictional vibration damper capable of accommodating both gradual and rapid vibrations applied to a structure attached to said damper from externally thereof.

Other objects and advantages of the invention will become more readily apparent in light of the following detailed description of the preferred embodiments.

DESCRIPTION OF THE PREFERRED EMBODIMENTS

Figure 1:
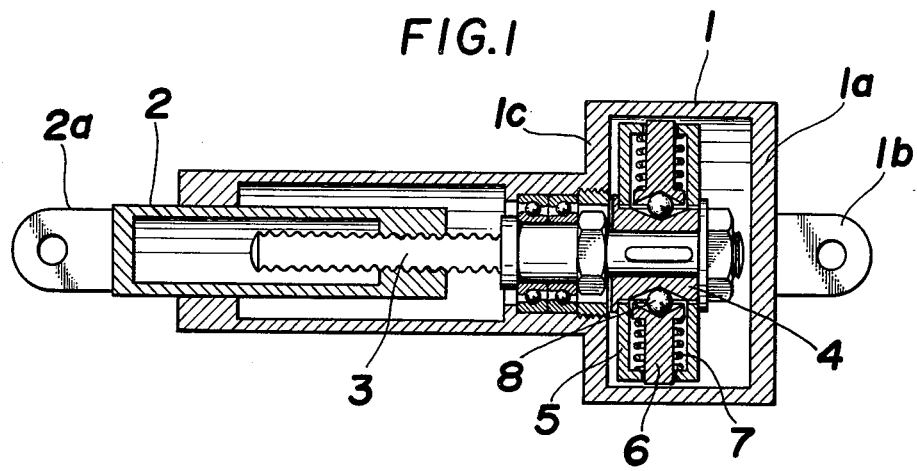
FIG. 1 is an elevational view in section of a first embodiment of the invention.

Referring now to the drawings wherein similar structural features of the invention in the several embodiments thereof are referred to by like numerals, the embodiment of FIG. 1 is seen to be provided with a primary housing 1, the housing 1 being of substantially cylindrical shape and having spaced end walls 1a and 1c, the end wall 1a having a handle 1b attached to the exterior surface thereof. The primary housing 1 extends externally of the end wall 1c to form a tubular extended portion within which an auxiliary housing 2 is slidably inserted through the open distal end of the extended portion of the primary housing 1, the auxiliary housing 2 being provided with a handle 2a formed on the distal end of said housing 2 exteriorly of the primary housing 1. The handles 1b and 2a are substantially aligned along coincidental longitudinal axes of the primary and auxiliary housings 1 and 2, the handles preferably having apertures formed therein for facilitating attachment of said handles to structure external of the present apparatus. A screw rod 3 is disposed within the primary housing 1, a threaded distal end portion of the rod 3 being matingly received within a threaded aperture formed in the proximal end portion of the auxiliary housing 2. The rod 3 is rotatably mounted such as by bearings within the interior of the housing 1, that portion of the rod extending into the interior of the radially enlarged portion of the housing 1 having an inner wheel member 4 mounted thereto, the inner wheel member having central outer perimetric portions formed into the shape of a bobbin, the inner wheel member being fixed to the rod 3 at the proximal end thereof. An outer wheel member 5 of substantially hollow cylindrical shape is rotatably carried on the rod in surmounting relation to the inner wheel member 4, the outer wheel member 5 having a plurality of radial apertures formed perimetrically therein about central cylindrical surface portions thereof, the apertures being formed at spaced regular intervals about said wheel 5. A plurality of friction pins 6 are disposed within the confines of the outer wheel member 5, one each of the pins 6 being slidably inserted in each of the radial apertures formed in the cylindrical surface of said outer wheel member. Each friction pin 6 is capable of contact at its inner end with the outer periphery of the inner wheel member 4 and at its outer end with the inner surface of the primary housing 1. Each friction pin 6 further is provided with a spring 7 which biases against an enlarged inner end portion of said pin 6 at one end of said pin and against inner wall surfaces of the outer wheel member 5 about the periphery of one of said apertures formed therein as aforesaid, the spring 7 biasing the friction pin 6 toward the interior of the primary housing 1. A conical depression formed in the inner end of each of the friction pins 6 and disposed in facing relation to concave facing portions of the inner wheel member 4 receive a spherical ball member 8, the ball member 8 being disposed between the conical depression in the friction pin and the concave surfaces of the inner wheel member 4, a very slight clearance being maintained between the outer end of the friction pin 6 and the outer wheel member 5.

In use, the present device is attached to a structure such as the wall of a building by means of one of the handles 1b or 2a, the other handle being connected to a section of pipe or other structural member whose motion relative to a stationary building structure is to be damped. When a relatively slow frictional movement is caused to occur between the primary housing 1 and the auxiliary housing 2, such as by a relatively slow displacement of the section of pipe to which the present device is connected, the rod 3 will be caused to rotate. As each friction pin 6 is pressed toward the inner wheel member 4 by each of the springs 7, the outer wheel member 5 will correspondingly rotate integrally with the inner wheel member 4 at a sufficiently slow angular rate so as not to displace the section of piping. In a situation where the section of piping to which the present device is attached is caused to quickly vibrate, the rod 3 is caused to move in a rapid reciprocating manner and thus causes the inner wheel member 4 to be rapidly rotated. Due to inertia, however, if the outer wheel member 5 will not fully follow the rotation of the inner wheel member 4, a slip thus occurs between the rotations of said members. Accordingly, each of the ball members 8 are caused to roll along the slopes of each of the conical depressions in the inner ends of the friction pins 6 and against the concave surface portions of the inner wheel member 4, the friction pin 6 being radially displaced to bias against the inner wall surfaces of the primary housing 1. This motion is repeatedly made forwardly and reversely in response to the reciprocating rotation of the rod 3, the vibrations being thereby effectively damped by the frictional resistance between the distal end portions of the pins 6 and the inner wall surfaces of the primary housing 1. Accordingly, it is possible to line the inner surfaces of the primary housing 1 with a material which provides increased friction with minimal wear.

Figure 2:
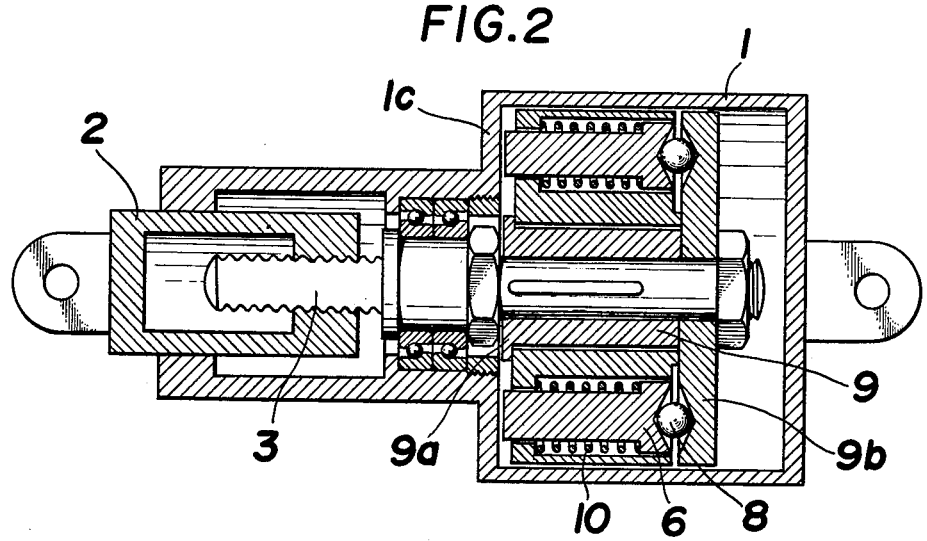
FIG. 2 is an elevational view in section of a second embodiment of the invention.

Referring now to FIG. 2, a second embodiment of the invention is seen to comprise a primary housing 1, an auxiliary housing 2, and a screw rod 3 of essentially the same configuration as that described relative to FIG. 1. However, the embodiment of FIG. 2 is seen to be provided with an inner wheel member 9 having an annular flange 9a formed at the distal end thereof, an end plate 9b being disposed on the rod 3 at the proximal end thereof and in abutting relation to the proximal end portion of the inner wheel member 9. An outer wheel member 10 is rotatably fitted over the inner wheel member 9 in a manner similar to that described relative to the wheel members 4 and 5 of FIG. 1. The outer wheel member 10 is formed with a plurality of apertures disposed at regular intervals about the periphery thereof, friction pins such as the friction pin 6 of FIG. 1 being resiliently mounted between spaced walls of the outer wheel member 10 and concave surface portions of the end plate 9b. As is seen in FIG. 2, the friction pin 6 and the apertures in the outer wheel member 10 have their longitudinal axes disposed parallel to the longitudinal axis of the rod 3, the friction pin being biased against inner wall surfaces of the primary housing 1 which lie in a plane perpendicular to the longitudinal axis of the rod 3. Proximal end portions of the friction pin 6 are formed with conical depressions which face the conical surface portion of the end plate 9b, ball members 8 being disposed one each between the proximal end portions of said friction pin 6 and the inner surface portions of the end plate 9b. Accordingly, a rapid reciprocating rotation of the rod 3 will cause the friction pin 6 to be displaced toward the auxiliary housing 2, the distal end portions of the friction pin 6 thereby contacting the inner wall surfaces of the end wall 1c to thereby damp the vibratory motion.

Figure 3:
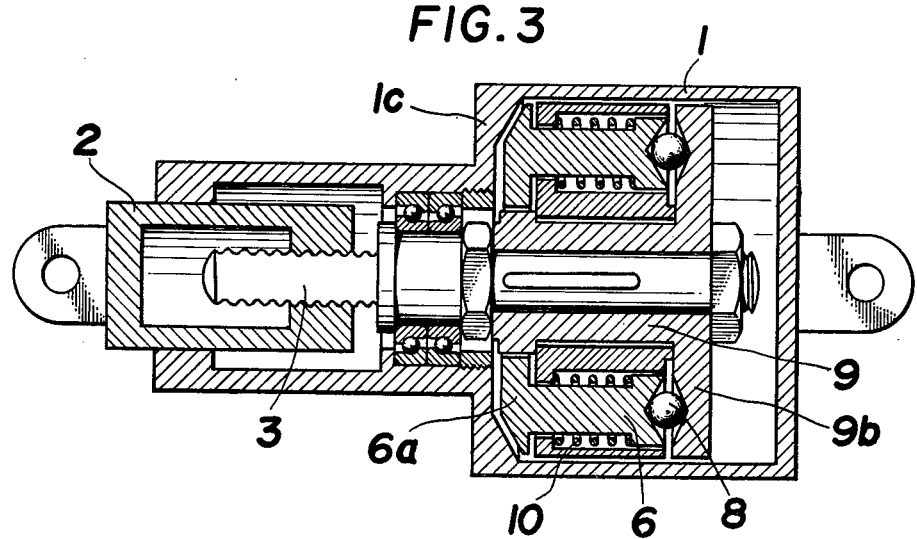
FIG. 3 is an elevational view in section of a third embodiment of the invention.

In the embodiment of FIG. 3, a brake plate 6a is formed on the distal end portions of the friction pin 6 in order to increase the frictional resistance of the friction pin with the inner surface of the primary housing 1 said brake plate having an engagement surface of larger area than the maximum cross-section of the pin. Also the engagement surface has relatively inclined portions for engaging complimentary portions of the inner surface of the primary housing. It should further be noted that the function of the ball members 8 can be assumed through a direct contact between the proximal end portion of the friction pin 6 and the concave surface portions of the inner wheel member 4 in a manner believed apparent from the foregoing description. Accordingly, it is understood that the present invention is to be limited only by the scope of the appended claims.

What is claimed is:

1. A frictional vibration damper comprising a primary housing provided at one end with an end wall and means for attaching said housing to a structure, the housing having an opening at the other end, an auxiliary housing inserted axially through said opening of said primary housing, said auxiliary housing projecting from said primary housing and being provided with means for connecting said auxiliary housing to an object which is to be vibrationally damped, a screw rod rotatably mounted in said primary housing and being threadably connected at one end thereof with the auxiliary housing, said rod having its axis substantially perpendicular to said end wall of said primary housing, said rod having a second end thereof disposed within a portion of the primary housing remote from the auxiliary housing, a first wheel member in said portion of said primary housing and fixed to said second end of said rod, said first wheel having a surface substantially parallel to said end wall of said primary housing and formed with a plurality of concave depressions, a second wheel member rotatably mounted within said portion of the primary housing coaxially with said first wheel member, said second wheel member having a series of circumferentially spaced apertures therein, a friction pin mounted in each said aperture, each friction pin being substantially parallel to said rod, each friction pin having one end adjacent one of said depressions in said surface of the first wheel member and an opposite end adjacent an internal wall surface of said primary housing, resilient biasing means urging said friction pins towards said surface of said first wheel member and reaction means at said one end of each friction pin interacting between the pin and the adjacent depression for moving the pin axially against said resilient means and into friction contact at its opposite end with said internal wall surface when the first wheel member is reciprocably rotated, by movement of said reaction means relative to said depression caused by inertial resistance of said second wheel member, said opposite end of each friction pin comprising a brake plate for frictionally engaging said internal wall surface, said brake plate having an engagement surface of larger area than the maximum cross-sectional area of said pin, said internal wall surface having a radially inner portion substantially parallel to said end wall of said primary housing and a radially outer portion inclined towards said end wall of said primary housing and said engagement surface of each friction pin having first and second relatively inclined portions for engaging the inner and outer portions of said internal wall surface respectively.

2. The damper of claim 1 wherein said reaction means comprises a ball interposed between said one end of each friction pin and said surface of the first wheel member, each ball being located in one of said depressions in said surface.

* * * * *